(No Model.)
F. C. FLADD.
SPRUE CUTTER.
No. 311,738. Patented Feb. 3, 1885.
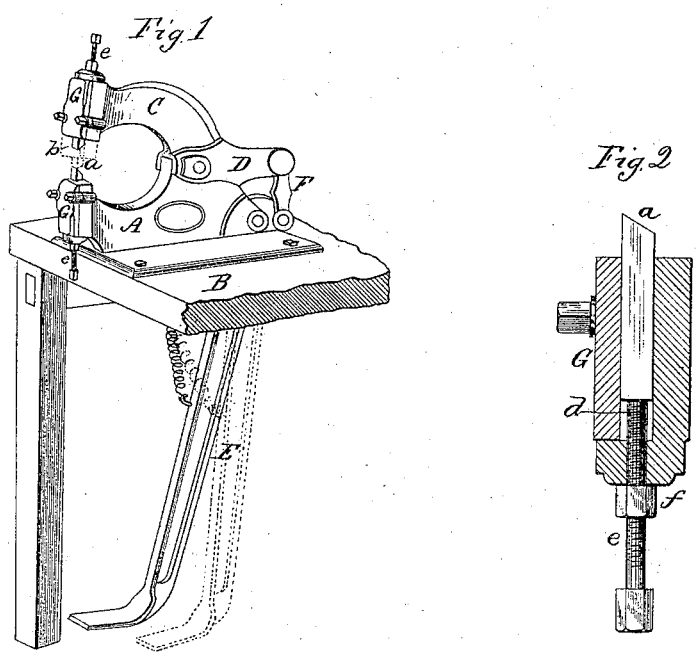

United States Patent Office.

FREDERICK C. FLADD, OF MIDDLETOWN, CONNECTICUT, ASSIGNOR TO THE STILES & PARKER PRESS COMPANY, OF SAME PLACE.

SPRUE-CUTTER.

SPECIFICATION forming part of Letters Patent No. 311,738, dated February 3, 1885.

Application filed September 22, 1884. (No model.)

*To all whom it may concern:*

Be it known that I, FREDERICK C. FLADD, of Middletown, in the county of Middlesex and State of Connecticut, have invented a new Improvement in Sprue-Cutters; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of the sprue-cutter as arranged upon the bench ready for operation, broken lines indicating the cutter as closed; Fig. 2, a vertical section through the recess, showing a side view of the cutter and of the set-screw.

This invention relates to an apparatus for cutting the sprue from small castings, the object being to provide a cutter so arranged that the workman may hold the casting in his hand, present the sprue to the cutters, and then with his foot bring the cutters together to cut off the sprue, and in such an apparatus as more fully hereinafter described, and particularly recited in the claims, my invention consists.

The apparatus consists of a base, A, constructed for attachment to a bench, B, and a lever hinged to the base, one arm, C, extending forward, the other arm, D, rearward, and with which arm a foot-lever, E, is connected by a link, F, so that the operator placing his foot upon the lever may give it a swinging movement, as indicated in broken lines, Fig. 1, and thereby impart an oscillatory movement to the arm C. The base A carries one cutter, *a*. The arm C carries the second or companion cutter, *b*. In the outer end of both the arm and the base a recess, *d*, is formed, to receive the cutter. The cutter is best made from a straight bar of steel corresponding in shape to the recess in the cutter-holders. Through the bottom of the recess a set-screw, *e*, is introduced, parallel with the recess, and so as to abut against the inner end of the cutter, as seen in Fig. 2, and on the set-screw is a jam-nut, F, by which, after the screw has been adjusted, it may be set. Upon the outside of the cutter-holders—that is, as a cover for the recess and cutter—a cap, G, is arranged and secured by screws, as shown. The cutters are arranged alike in both the fixed and movable supports and for like adjustment, and so that when the arm C is thrown downward the two edges will come substantially together and make a cut similar to that produced by the cold-chisel in the hand of the workman, and which is the usual method of cutting off the sprue. By this apparatus the sprue is cut without the shock to the casting unavoidably produced by the cold-chisel and hammer, and the breakage incident upon such shock is avoided; but not only is this loss in casting prevented, but the cutting is greatly facilitated, and the same workman will accomplish a much greater amount of work than can be done with the chisel and hammer.

By making the cutters from a plain bar of steel, and the machine being constructed with seats therefor, the end of the cutter only requires to be ground to sharpen it, and as it is thus ground away the set-screws will force it outward, so that the bar may be almost entirely consumed in the machine.

The arrangement of cutters described—that is to say, a holder constructed with a recess corresponding to the shape of the cutter-bar, and with an adjusting-screw in line therewith to bear against and adjust the cutter, with a cap to secure said cutter in its place—may be employed where one of the cutters is made reciprocating, as in a guided slide, instead of on an oscillating lever. I therefore do not wish to limit this part of my invention to the levers.

I do not claim, broadly, the arrangement of a cutter in its holder having combined therewith an adjusting-screw, by which the cutter may be adjusted longitudinally, as such, I am aware, is not new.

I claim—

1. In a sprue-cutter, the combination of two cutter-holders arranged, one stationary, the other having a reciprocating movement imparted to it toward and from the one, each of said holders constructed with a vertical recess, the recess in the one being in line with the recess in the other, and each recess corresponding to the shape of the cutter-bar, a cutter-bar arranged in each of said recesses, their cutting ends toward each other, the set-screw in each of said holders in line with the cutter-bar, and so as to form an adjustable abutment for each of said cutter-bars, and a cap removably attached to said holders, and so as to close the open side of said recesses and hold the cutter therein, yet leave them adjustable by their own set-screws, substantially as described.

2. The combination of the base A, the adjustable cutter $a$ therein, the second cutter-lever hung to said base, one arm, C, extending forward over the base, a cutter, $b$, arranged therein corresponding to the fixed cutter $a$, the other arm, D, of said lever extending rearward, and the foot-lever E, in connection with said arm D, substantially as and for the purpose described.

3. The base A, having a vertical recess, $d$, in its forward end, the cutter $a$, arranged in said recess, a set-screw. $e$, through the bottom of said recess, and so as to abut against the inner end of the cutter, the cap G, arranged to close the front of said recess and support the cutter, the lever hung to said base, one arm, C, extending forward and constructed at its outer end with a recess corresponding to the recess in the base below, a like cutter, $b$, arranged in said recess, and a like adjusting-screw to abut against the inner end of said cutter, and a like cap, G, arranged to close the recess and support the cutter, the other arm, D, of said lever extending rearward, the foot-lever in connection with said arm D, substantially as described.

4. The base A, having a vertical recess, $d$, in its forward end, the cutter $a$, arranged in said recess, a set-screw, $e$, through the bottom of said recess, and so as to abut against the inner end of the cutter, the cap G, arranged to close the front of said recess and support the cutter, the lever hung to said base, one arm, C, extending forward and constructed at its outer end with a recess corresponding to the recess in the base below, a like cutter, $b$, arranged in said recess, and a like adjusting-screw to abut against the inner end of said cutter, and a like cap, G, arranged to close the recess and support the cutter, substantially as described.

FREDERICK C. FLADD.

Witnesses:
HARRIS WARNER,
CHAS. W. WARNER.